(12) United States Patent
Card et al.

(10) Patent No.: US 8,002,311 B2
(45) Date of Patent: Aug. 23, 2011

(54) AIRBAG WITH SECTIONS OF DIFFERENT DEPLOYMENT LENGTHS

(75) Inventors: Gary Andrew Card, Macomb, MI (US); John Paul Ruterbusch, Auburn Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 214 days.

(21) Appl. No.: 11/976,737

(22) Filed: Oct. 26, 2007

(65) Prior Publication Data

US 2008/0116670 A1 May 22, 2008

Related U.S. Application Data

(60) Provisional application No. 60/854,451, filed on Oct. 26, 2006.

(51) Int. Cl.
- *B60R 21/232* (2006.01)
- *B60R 21/214* (2006.01)
- *B60R 21/216* (2006.01)

(52) U.S. Cl. ............. 280/730.2; 280/743.1; 280/743.2

(58) Field of Classification Search .............. 280/730.2, 280/729, 743.1, 743.2, 728.2, 728.3; *B60R 21/16, B60R 21/22*
See application file for complete search history.

(56) References Cited

U.S. PATENT DOCUMENTS

| | | | | |
|---|---|---|---|---|
| 6,135,493 A * | 10/2000 | Jost et al. | | 280/730.2 |
| 6,155,596 A * | 12/2000 | Nakajima et al. | | 280/730.2 |
| 6,231,072 B1 * | 5/2001 | Pywell et al. | | 280/730.2 |
| 6,244,619 B1 * | 6/2001 | Satzger | | 280/730.2 |
| 6,338,498 B1 * | 1/2002 | Niederman et al. | | 280/728.2 |
| 6,341,797 B1 * | 1/2002 | Seo | | 280/730.2 |
| 6,371,512 B1 * | 4/2002 | Asano et al. | | 280/730.2 |
| 6,386,578 B1 * | 5/2002 | Nanbu et al. | | 280/730.2 |
| 6,457,740 B1 * | 10/2002 | Vaidyaraman et al. | | 280/730.2 |
| 6,481,743 B1 * | 11/2002 | Tobe et al. | | 280/728.2 |
| 7,322,600 B2 * | 1/2008 | Inoue et al. | | 280/730.2 |
| 7,628,421 B2 * | 12/2009 | Wright | | 280/730.2 |
| 7,784,822 B2 * | 8/2010 | Fink | | 280/730.2 |
| 2003/0205888 A1 * | 11/2003 | Keshavaraj | | 280/730.2 |
| 2004/0070184 A1 * | 4/2004 | Takahara | | 280/730.2 |
| 2004/0090050 A1 * | 5/2004 | Dominissini et al. | | 280/730.1 |
| 2005/0087961 A1 * | 4/2005 | Lee | | 280/728.2 |
| 2005/0110251 A1 * | 5/2005 | Tesch et al. | | 280/730.2 |
| 2006/0186652 A1 * | 8/2006 | Sunabashiri | | 280/740 |
| 2007/0052212 A1 * | 3/2007 | Powals | | 280/729 |
| 2007/0182143 A1 * | 8/2007 | Wright | | 280/743.2 |
| 2008/0012275 A1 * | 1/2008 | Pinsenschaum et al. | | 280/730.2 |
| 2008/0224457 A1 * | 9/2008 | Brough et al. | | 280/730.2 |
| 2009/0079171 A1 * | 3/2009 | Dix et al. | | 280/730.2 |

* cited by examiner

*Primary Examiner* — Toan C To
*Assistant Examiner* — Barry Gooden, Jr.
(74) *Attorney, Agent, or Firm* — Foley & Lardner LLP

(57) ABSTRACT

An airbag system including an airbag having a first section and a second section coupled to the first section. The airbag further includes an inlet coupled to an inflatable portion. The first section is configured to inflate between a trim member and a vehicle frame; and the second section is configured to inflate into a vehicle cabin.

23 Claims, 6 Drawing Sheets

AIRBAG WITH SECTIONS OF DIFFERENT DEPLOYMENT LENGTHS

CROSS-REFERENCE TO RELATED PATENT APPLICATIONS

This application claims priority from U.S. Provisional Application No. 60/854,451, filed Oct. 26, 2006, incorporated herein by reference in its entirety.

BACKGROUND

The present invention relates generally to the field of airbags. More specifically, the invention relates to curtain type airbags configured to deploy along the side of the vehicle.

Curtain or roof rail airbags are typically deployed from behind a trim element in a vehicle. The airbag deploys between the sheet metal of the vehicle and the trim element and then out into the vehicle cabin to protect an occupant or occupants. In conventional airbag systems, the airbag can tear or snag on the trim element as the airbag deploys around or in front of the trim element (typically by the trim element breaking or pivoting away to release the airbag). Some vehicles have a trim component to trim component interaction or interface area. Other vehicles have a trim component to trim component to headliner interaction or interface area. In either of these configurations, the airbag may snag puncture itself on the trim components. Further, additional elements are required so that the airbag can be properly installed and inflated.

Typical airbags may have difficulty in positioning and restraining an occupant in certain "difficult to deploy" situations, which can be trim-trim and trim-trim-headliner interface areas.

SUMMARY

One disclosed embodiment relates to an airbag including a first section and a second section coupled to the first section. The airbag further includes an inlet coupled to the airbag. The first section is configured to inflate between a trim member and a vehicle frame; and the second section is configured to inflate into a vehicle cabin.

Another disclosed embodiment relates to an airbag module including an inflator and an airbag coupled to the inflator. The airbag includes a first section and a second section. The first section is configured to inflate between a trim member and a vehicle frame so that the first section doesn't deploy downward into a vehicle cabin and the second section is configured to inflate into a vehicle cabin.

A further disclosed embodiment relates to an airbag system including an inflator and an airbag having an inflator inlet coupled to the inflator. The airbag further includes a first section and a second section. The airbag is coupled to a vehicle frame. The airbag system further includes a first trim member coupled to the vehicle frame and positioned over the first section of the airbag. The first section of the airbag is configured to inflate between the first trim member and the vehicle frame so that the first section doesn't deploy downward into a vehicle cabin. The second section of the airbag is configured to inflate downward into a vehicle cabin. The first trim component is configured to act as a load distribution plate to evenly distribute an impact to the first section after the first section inflates.

The invention is capable of other embodiments and of being practiced or being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Figure 1:
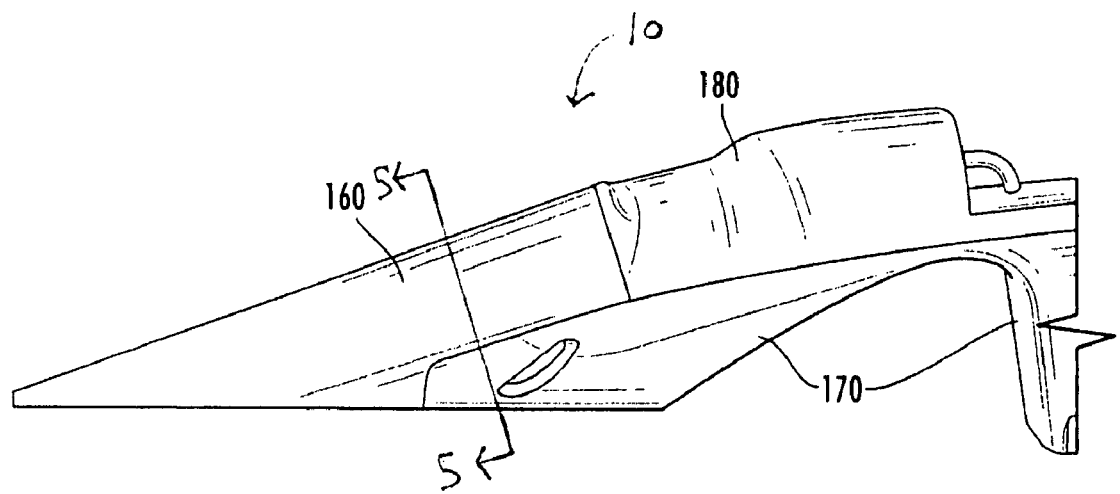
FIG. 1 is a view of an airbag system for use in an interface area of a trim component and a vehicle headliner.
Figure 2:
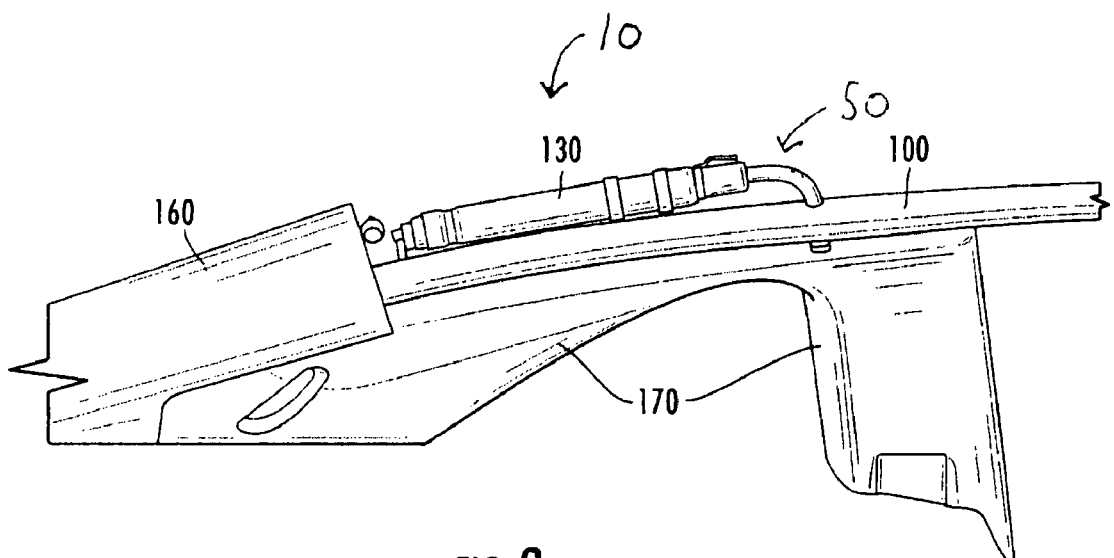
FIG. 2 is a view of the system of FIG. 1 with the headliner removed.

Referring generally to FIGS. 1-8, and more specifically to FIGS. 1 and 2, an airbag system 10 is shown according to an exemplary embodiment. The airbag system 10 may include an airbag module 50 and a load distribution plate or member shown as first trim member 160. The airbag module 50 may include an inflatable curtain airbag cushion or airbag 100 and an inflation device or inflator 130.

The airbag system 10 may also include a second trim member 170 and a headliner 180 as shown in FIG. 1. First trim member 160, second trim member 170 and headliner 180 interact or join together to form a trim-trim-headliner interface. The airbag module 50 is configured to be installed in a vehicle at the trim-trim-headliner interface of first trim member 160, second trim member 170 and headliner 180. First trim member 160 and second trim member 170 may be constructed of hard plastic. In an alternative embodiment, first trim member 160 and second trim member 170 may be constructed of soft plastic or other suitable materials known in the art.

Figure 3:
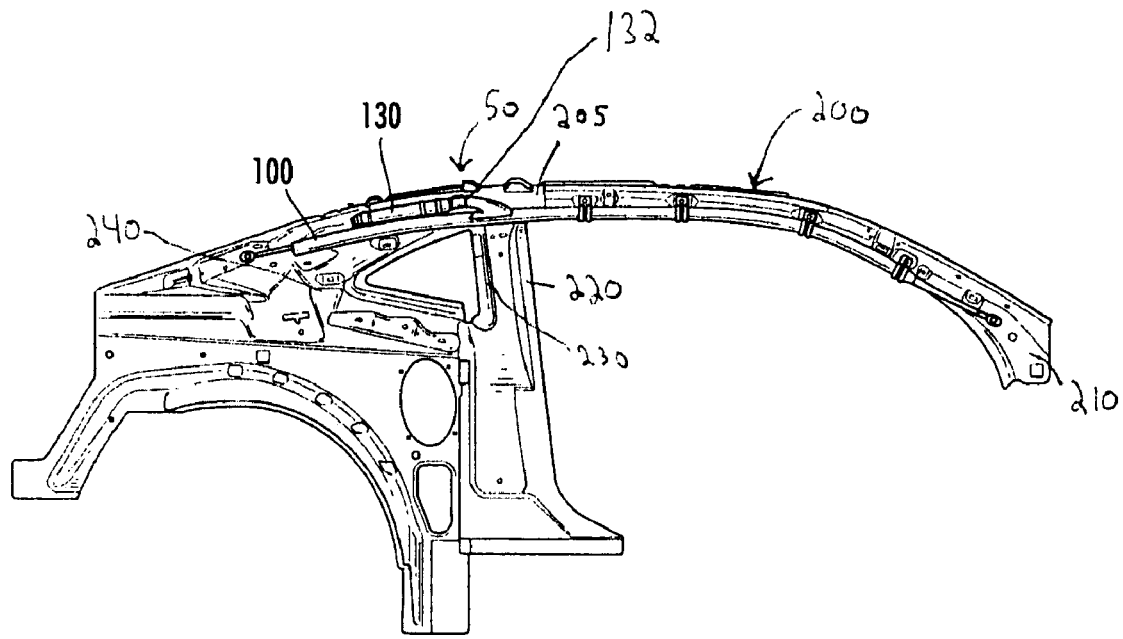
FIG. 3 is a view of the system of FIG. 1 with the trim and headliner removed.

Referring to FIG. 3, vehicle frame 200 is shown to comprise a roof rail 205, an A-pillar 210, a B-pillar 220, and a C-pillar 240. Airbag module 50 is shown coupled to a vehicle frame 200 according to an exemplary embodiment. In an alternative embodiment, airbag module 50 may be integrated or coupled to a trim component. The airbag 100 is shown in FIG. 3 to be mounted to the roof rail 205 of the vehicle frame 200. According to an exemplary embodiment, the airbag 100 extends from the A-pillar 210 to the C-pillar 240. Once inflated, airbag 100 provides protection for both a front seat occupant and a back seat occupant. In an alternative embodiment, airbag 100 may extend from the A-pillar 210 to the B-pillar 220, or from the A-pillar 210 to a D-pillar, depending on the vehicle type. In another alternative embodiment, airbag 100 may extend from the B-pillar 220 to the C-pillar 240, or from the B-pillar 220 to a D-pillar. In yet another alternative embodiment, airbag 100 may extend from the front windshield to the rear windshield of a vehicle.

As shown in FIGS. 1-3, the first trim member 160 and the second trim member 170 are hard trim components in the vehicle cabin and are visible to an occupant. First trim member 160 is configured to cover the interior portion of the C-pillar 240 of the vehicle frame 200. In an alternative embodiment, first trim member 160 may directly cover the vehicle frame 200. As shown in FIGS. 1-3, second trim member 170 is configured to cover the interior portion of the B-pillar 220 and a portion of the vehicle frame 200. Headliner 180 is a soft trim component in the vehicle cabin and is visible to an occupant. Headliner 180 is configured to cover the interior portion of the roof of the vehicle (not shown) and may be constructed from materials known in the art.

Figure 4:
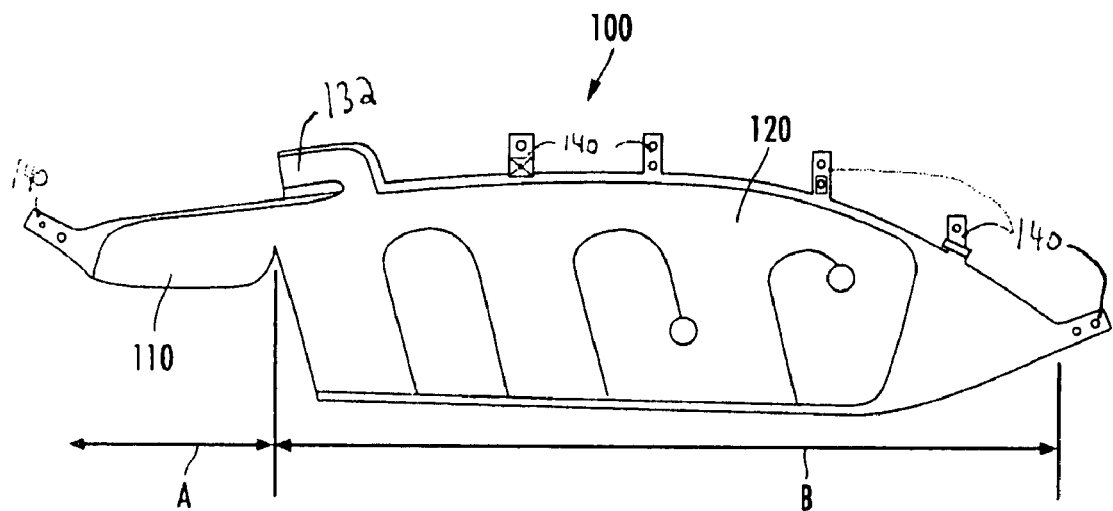
FIG. 4 is a view of a deployed airbag for use in the system of FIG. 1.

Referring to FIG. 4, airbag 100 may include a first section 110 (as represented by arrow A) and a second section 120 (as represented by arrow B). The first section 110 may be integrally formed with the second section 120, such that air may flow (in fluid communication) between the two sections 110, 120. Alternatively, the first section 110 may be a separate section that is connected (directly or indirectly) to the second section 120. The first section 110 may be rolled, folded or unfolded. The second section 120 may be folded or rolled in any appropriate manner for a roof rail airbag. In the embodiment shown in the figures, second section 120 is configured to inflate and deploy downward into a vehicle cabin area in front of trim components. Airbag 100 may be constructed from materials known in the art.

Still referring to FIG. 4, the airbag 100 is shown to include an inflation inlet shown as inlet 132. Inlet 132 is used to connect inflator 130 to airbag 100. As shown in FIG. 4, inlet 132 is positioned between first section 110 and second section 120. When airbag 100 is deployed, this position of inlet 132 allows both sections 110, 120 to be quickly and simultaneously filled. In an alternative embodiment, inlet 132 may be located in first section 110, or may be located in second section 120. Alternatively, separation gas introduction ports may be provided so that inflation gas is provided to the first and second inflatable sections of the airbag in a controlled manner.

Airbag 100 is shown in FIG. 4 to include an inflatable horizontal chamber in first section 110 and multiple vertical chambers in second section 120. The airbag 100 may be configured in multiple shapes and sizes. Airbag 100 may comprise any number, shape and size of horizontal and/or vertical chambers. Airbag 100 also includes multiple attachment points 140. Attachment points 140 may be positioned at any point along the top of airbag 100 and may be constructed from materials known in the art.

As shown in FIGS. 1 and 2, first section 110 of airbag 100 is positioned or extends behind first trim member 160. In other words, airbag 100 is positioned between first trim member 160 and the vehicle frame 200 (see FIG. 5). According to an exemplary embodiment, first section 110 is configured to inflate between the first trim member 160 and the vehicle frame 200. In an alternative embodiment, first section 110 may be configured to inflate out and around first trim member 160.

When airbag 100 deploys, the first section 110 and second section 120 are inflated by gas provided by the inflator 130. In the exemplary embodiment shown in FIGS. 1 and 2, second section 120 inflates out and around headliner 180 downward into the vehicle cabin. In an alternative embodiment, second section 120 may inflate out and around second trim member 170.

Figure 7:
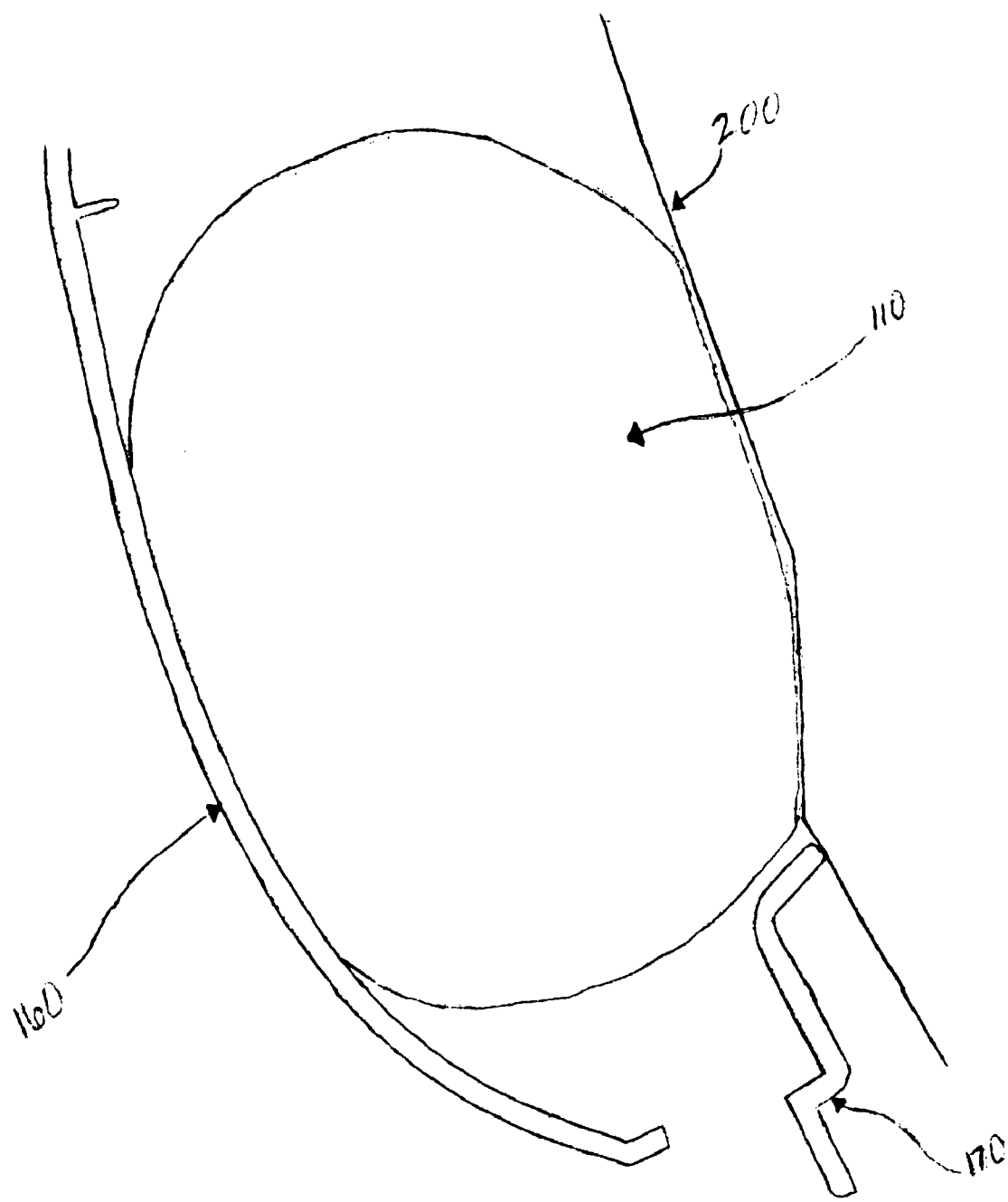
FIG. 7 is a sectional view taken generally along line 5-5 of FIG. 1 showing an airbag system after inflation of the airbag.
Figure 8:
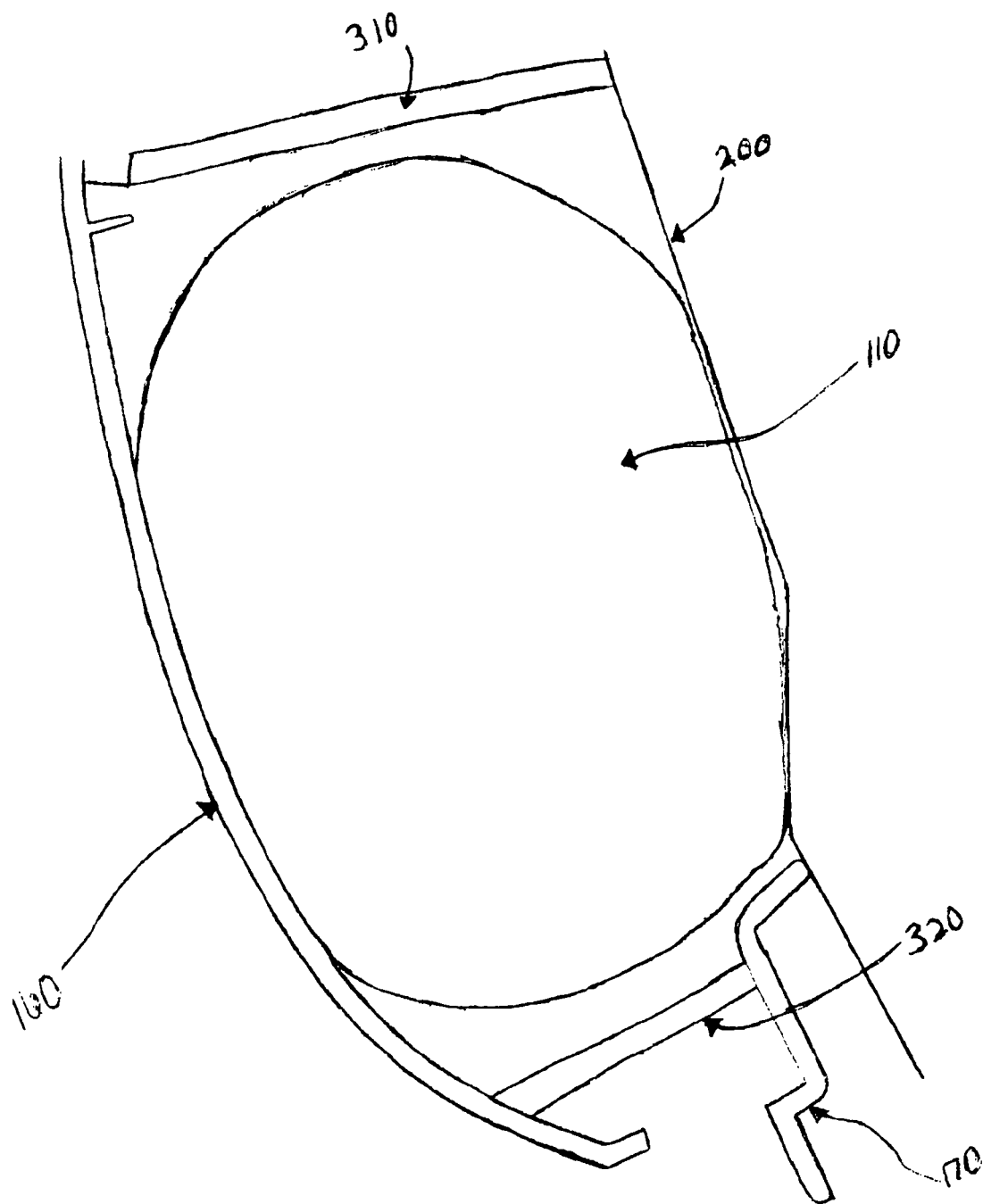
FIG. 8 is a sectional view taken generally along line 5-5 of FIG. 1 showing an airbag system after inflation according to an alternative embodiment.

As shown in FIG. 7, first section 110 inflates between first trim member 160 and the vehicle frame 200 when airbag 100 deploys. The first trim member 160 then acts as a load distribution plate, such that if an occupant impacts the first trim member 160, the impact is distributed evenly in the first section 110 and also possibly in the second section 120. When the first section 110 inflates behind the first trim member 160, the airbag will not tear or snag on the hard trim because the first section 110 does not inflate over the first member 160 and next to (near, adjacent) the second component 170. Furthermore, the positioning of the first section 110 minimizes the need for additional parts or for two separate airbags in the often complicated trim-trim-headliner interface area.

Figure 5:
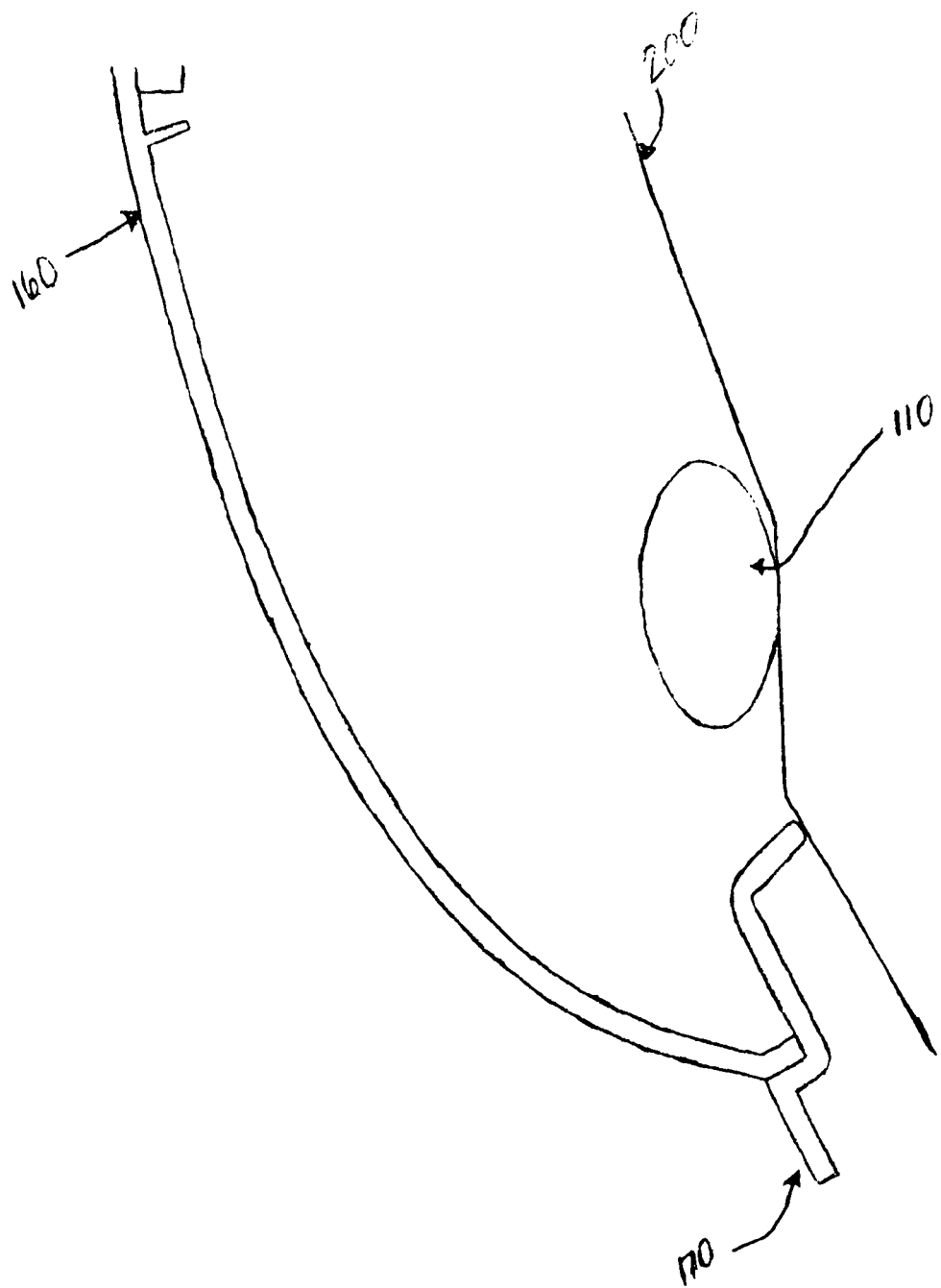
FIG. 5 is a sectional view taken generally along line 5-5 of FIG. 1.

In the exemplary embodiment shown in FIG. 5, the first trim member 160 is flush or adjacent to the second trim member 170 before deployment of first section 110. After deployment and inflation of first section 110, first trim member 160 moves out or away from the vehicle frame 200 and the second trim member 170.

Figure 6:
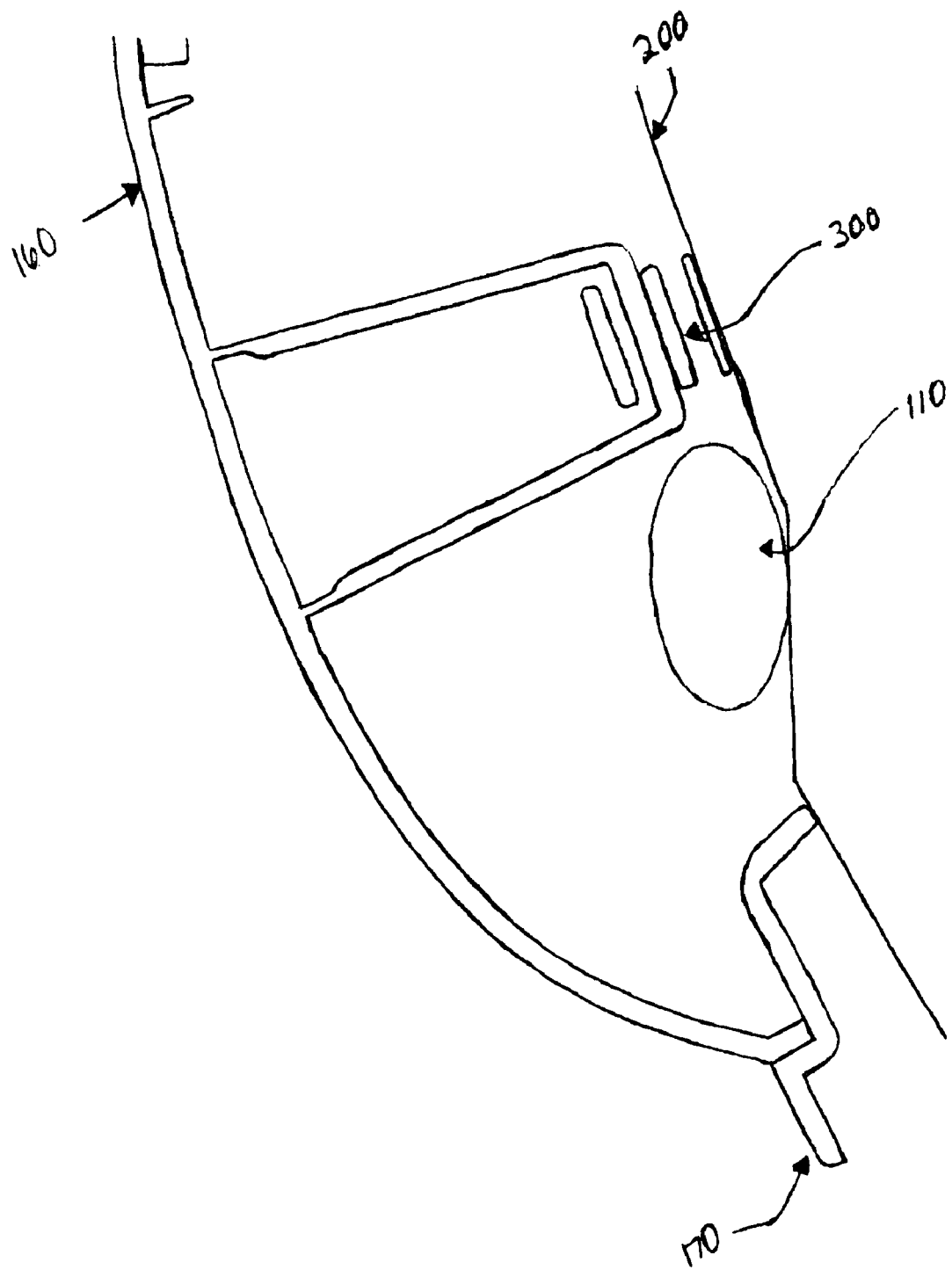
FIG. 6 is a sectional view taken generally along line 5-5 of FIG. 1 showing an airbag system prior to inflation of the airbag.

As shown in FIGS. 5 and 6, the airbag 100 is stored in a package. The packaged cushion or airbag may be rolled, folded as necessary to conform to desired deployment and storage characteristics. The first inflatable section 110 of the airbag 100 may be stored in an unfolded fashion, while the second section 120 of the airbag may be rolled or folded as appropriate.

In an alternate embodiment, first trim member 160 may move, adjust, pivot or hinge when first section 110 is inflated. In the embodiment shown in FIG. 6, first trim member 160 is coupled to vehicle frame 200 by a tether 300. Tether 300 includes a guide member to guide and direct first section 110 during deployment and inflation. In the embodiment shown in FIG. 8, first trim member 160 is coupled to vehicle frame 200 by a first attachment member shown as top tether 310 and a second attachment member shown as bottom tether 320. Tethers 300, 310 and 320 may be constructed from materials known in the art. As one skilled in the art would appreciate, tethers 300, 310, and 320 may be coupled to the vehicle frame and trim members in multiple ways and positions. In the embodiment shown in FIGS. 5-8, second trim member 170 is stationary (i.e. does not move) when first section 110 is deployed and inflated. In an alternative embodiment, second trim component 170 may move, adjust, pivot or hinge when airbag 100 is inflated.

According to one aspect of the invention, a roof rail airbag system has a multi-trim coverage application that provides for roof rail airbag deployment comprising typical direct coverage for an occupant and also utilizes a pillar trim as a loading/distributor surface.

According to another aspect of the present invention, the roof rail airbag system can provide adequate restraint in a difficult to deploy condition. In an aspect of the invention, the roof rail airbag can eliminate the need for an entire cushion to clear and position itself in front of vehicle trim components. The roof rail airbag, according to an aspect of the invention, is capable of utilizing the trim to distribute load to the airbag cushion. The trim may be comprised of a hard plastic, or any other suitable material.

According to yet another aspect of the invention, the roof rail airbag system allows split trim and headliner applications, for example, to utilize trim to distribute load into the airbag cushion. The roof rail airbag system design can help deployment and minimize airbag integrity concerns.

The construction and arrangement of the airbag, airbag module, or air bag system shown and described in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes, and proportions of the orientations, etc.) without materially departing from the novel teachings and advantages of the subject matter recited in the description. For example, elements shown as integrally formed may be constructed of multiple parts or elements, the position of elements may be reversed or other wise varied, and the nature or number of discrete elements or positions may be altered or varied. Other substitutions, modifications, changes, and omissions may be made in the design, operating conditions and arrangement of the exemplary embodiments without departing from the scope of the invention as expressed in the appended claims.

What is claimed is:

1. An airbag configured to extend longitudinally along a side of a vehicle comprising:
   a first section configured to extend in longitudinal and vertical directions;
   a second section coupled to the first section and configured to extend in longitudinal and vertical directions; and
   an inlet for receiving inflation gas from an inflator;
   wherein the length of the first section in the vertical direction is substantially less than the length of the second section in the vertical direction so that the first section solely inflates in a region located between a first trim member and a vehicle frame and the second section inflates into a vehicle cabin; and
   wherein the first section is located adjacent to the second section in a longitudinal direction such that the first section does not overlap with the second section in the longitudinal direction after inflation; and
   wherein top edges of the first and second sections form a top edge of the airbag after inflation, and wherein the top edge of the airbag extends along the longitudinal direction; and
   wherein the inlet is positioned between the first section and second section.

2. The airbag of claim 1, wherein the first section is integrally formed with the second section.

3. The airbag of claim 2, wherein the first section and the second section are in fluid communication.

4. The airbag of claim 1, wherein the first section is a separate section connected to the second section.

5. The airbag of claim 1, wherein the first section comprises a single longitudinally extending chamber and the second section comprises multiple vertical extending chambers.

6. The airbag of claim 1, wherein the first section and second section are inflated simultaneously.

7. The airbag of claim 1, wherein the first section is a terminal section of the airbag in which gas flows into and out of the first section through a single passageway.

8. A curtain airbag module comprising:
   an inflator; and
   a curtain type airbag coupled to the inflator, the airbag having an inflator inlet coupled to the inflator, a first section and a second section, wherein the airbag module is configured so that the first section is located rearward of the second section when the airbag module is installed in a vehicle so that top edges of the first and second sections form a top edge of the airbag after inflation and the first section does not overlap with the second section in a longitudinal direction after inflation, and wherein the top edge of the airbag extends in the longitudinal direction;
   wherein the first section is configured to inflate between a first trim member and a vehicle frame so that the first section does not deploy downward into a vehicle cabin; and
   wherein the second section is configured to inflate into the vehicle cabin along a side of the vehicle; and
   wherein the inlet is positioned between the first section and second section.

9. The airbag module of claim 8, wherein the first trim member is configured to act as a load distribution plate to evenly distribute an impact to the first section of the airbag after the first section is inflated.

10. The airbag module of claim 8, wherein the first trim member is configured to act as a load distribution plate to distribute an impact to the first and second sections of the airbag after the first and second sections are inflated.

11. The airbag module of claim 8, wherein the airbag module is configured to be coupled to a roof rail of the vehicle.

12. The airbag module of claim 11, wherein the second section is configured to extend from an A-pillar of the vehicle to a C-pillar of the vehicle and the first section is configured to extend from the C-pillar of the vehicle to a D-pillar of the vehicle.

13. The airbag module of claim 8, wherein the first trim member is coupled to the vehicle frame by a tether.

14. The airbag module of claim 8, wherein the first trim member is coupled to the vehicle frame by a top tether and a bottom tether.

15. The airbag module of claim 8, wherein the first section is a terminal section of the airbag in which gas flows into and out of the first section through a single passageway.

16. An airbag system comprising:
   an inflator;
   an airbag having an inflator inlet coupled to the inflator, the airbag further having a first section and a second section, the airbag being coupled to a vehicle frame; and
   a first trim member coupled to the vehicle frame and positioned over the first section of the airbag;
   wherein the first section of the airbag is configured to inflate between the first trim member and the vehicle frame so that the first section does not deploy downward into a vehicle cabin;
   wherein the second section of the airbag is configured to inflate downward into the vehicle cabin;
   wherein the first section is located adjacent to the second section in a longitudinal direction such that the first section does not overlap with the second section in the longitudinal direction after inflation, and wherein top edges of the first and second sections form a top edge of the airbag after inflation, and wherein the top edge of the airbag extends along the longitudinal direction; and
   wherein the first trim member is configured to act as a load distribution plate to evenly distribute an impact to the first section after the first section inflates; and
   wherein the inlet is positioned between the first section and second section.

17. The airbag system of claim 16, wherein the first trim member is configured to act as a load distribution plate to distribute an impact to the first and second sections of the airbag after the first and second sections are inflated.

18. The airbag system of claim 17, wherein gas may flow between the first section and second section.

19. The airbag system of claim 16, wherein the first trim member is coupled to the vehicle frame by a top tether and a bottom tether; wherein the top tether is located above the first section of the airbag and the bottom tether is located below the first section of the airbag.

20. The airbag system of claim 16, wherein the second section of the airbag is a curtain type airbag configured to deploy along a side of the vehicle in the vehicle cabin.

21. The airbag system of claim 16, wherein the first section is a terminal section of the airbag in which gas flows into and out of the first section through a single passageway.

22. An airbag system comprising:
   an inflator;
   an airbag having an inflator inlet coupled to the inflator, the airbag further having a first section and a second section, the airbag being coupled to a vehicle frame; and
   a first trim member coupled to the vehicle frame and positioned over the first section of the airbag;
   wherein the first section of the airbag is configured to inflate between the first trim member and the vehicle frame so that the first section does not deploy downward into a vehicle cabin;
   wherein the second section of the airbag is configured to inflate downward into the vehicle cabin;
   wherein the first trim member is configured to act as a load distribution plate to evenly distribute an impact to the first section after the first section inflates;
   wherein the first trim member is coupled to the vehicle frame by a top tether and a bottom tether.

23. The airbag system of claim 22, wherein the top tether is located above the first section of the airbag and the bottom tether is located below the first section of the airbag.

* * * * *